July 25, 1961  L. O. KIEL  2,993,548
APPARATUS FOR STEERING AN IMPLEMENT ALONG A CROP ROW
Filed May 14, 1958
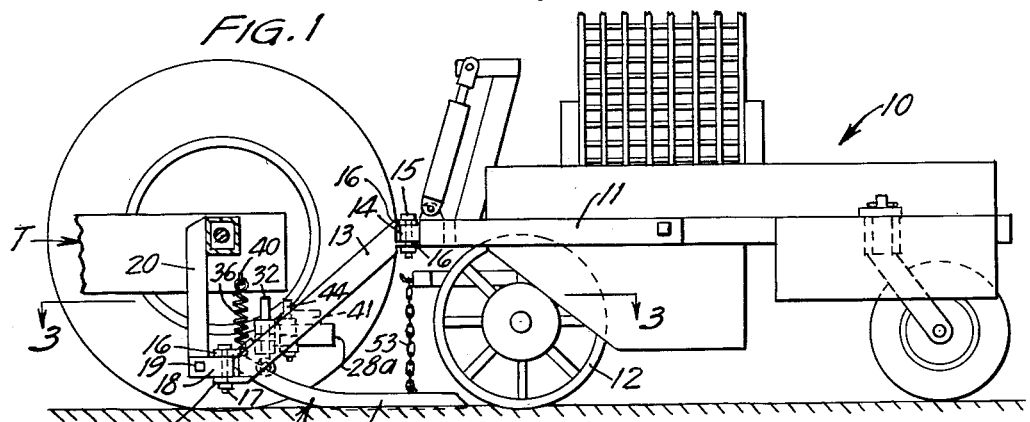
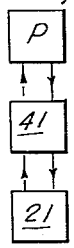
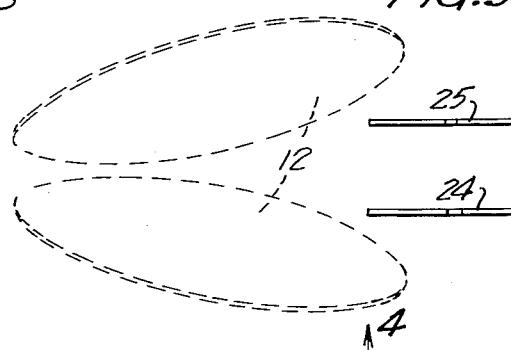
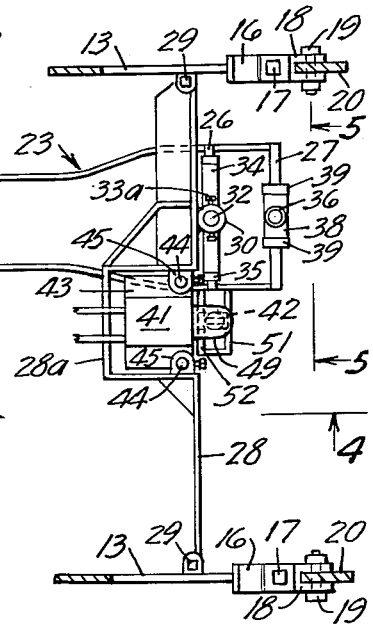
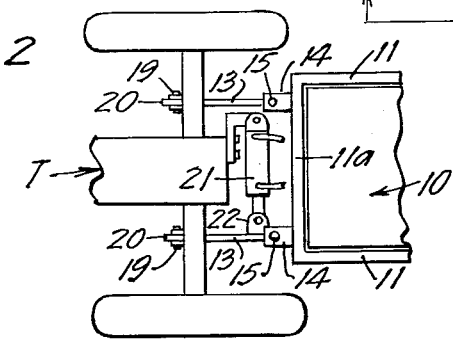
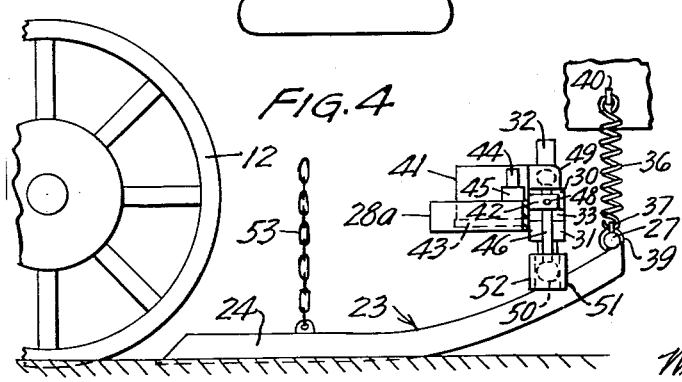
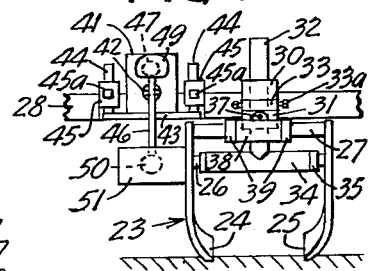
INVENTOR
LYLE OLIVER KIEL
Williamson Schroeder Holmoter
ATTORNEYS

United States Patent Office 2,993,548
Patented July 25, 1961

2,993,548
APPARATUS FOR STEERING AN IMPLEMENT ALONG A CROP ROW
Lyle Oliver Kiel, Crookston, Minn.
Filed May 14, 1958, Ser. No. 735,181
9 Claims. (Cl. 180—14)

This invention relates to apparatus for steering harvesting mechanism and the like along a crop row and more particularly relates to apparatus for use with crops such as sugar beets and the like which tend to project upwardly with respect to the level of the soil between the rows so that the location of the row may be easily detected.

An object of the present invention is to provide a new and improved crop row location-detecting and implement-steering mechanism of relatively simple and inexpensive construction and operation to cause the implement to precisely follow along a crop row for harvesting or the like.

Another object of my invention is the provision of novel mechanism for detecting the location of a crop row such as sugar beets and the like in relation to a tractor and implement such as a harvester moving along the row and for controlling the steering of the implement along the crop row so that the operator of the tractor need not devote his entire attention to the steering of the tractor and is free to direct a portion of his attention to other functions being carried out by the implement.

A further object of the invention is to provide an improved and novel crop row location detecting mechanism which operates equally as well on relatively smooth fields and fields which have substantial irregularities in the surface contour thereof, such as ditches extending transversely of the crop rows, to operate a steering mechanism which controls the location of the implement attached to the tractor.

These and other objects and advantages of my invention will more fully appear from the following description made in connection with the accompanying drawings wherein like reference characters refer to the same or similar parts throughout the several views and in which:

FIG. 1 is a general side elevational view showing the general use and arrangement of the invention as applied to an implement and a tractor, portions of which are broken away;

FIG. 2 is a detailed top plan view showing the general arrangement between the rear end of the tractor and the front end of the implement, and being shown in a somewhat smaller scale than FIG. 1;

FIG. 3 is a detailed sectional view taken approximately at 3—3 in FIG. 1, and showing the relative orientation between the crop row-locating mechanism and the harvesting wheels;

FIG. 4 is a detailed sectional view taken approximately at 4—4 in FIG. 3;

FIG. 5 is a detailed elevational view taken approximately at 5—5 in FIG. 3; and

FIG. 6 is a block diagram of the hydraulic circuit used in connection with the present invention.

The invention is shown mounted on an implement 10 which consists, in the form shown, in a sugar beet harvester having a frame structure 11 and having two pairs of beet harvesting wheels 12, each pair of which is to follow along a crop row with one wheel on each side of the row. It should be understood that sugar beets, as they grow in the field, project slightly upwardly out of the ground and the rows are frequently slightly hilled up, in relation to the surface of the soil between the rows.

The implement 10 is provided with means attachable to the tractor T for permitting movement of the implement relative to the tractor and transversely of the direction of travel. In the form shown, such attachment means comprise a pair of drawbar elements 13 which in this particular machine, extend forwardly and downwardly from the front horizontal cross member 11a of the frame structure. The drawbars 13 are swingably connected to the front cross member 11a for movement about vertical axes, and suitable bearings 14 are affixed to the cross member 11a for mounting a pivot pin 15 which also extends through bearing apertures in the rear ends of the draw bars 13. In the machine shown, the draw bars 13 at least partially support the front end portion of the implement 10 from the tractor. The forward lower ends of the drawbars 13 have apertured mounting ears 16 thereon which carry pivot bolts 17. Swingable mounting brackets 18 receive the pivot bolts 17 therethrough and are secured as by bolts 19 to the lower ends of depending frame members 20 which are affixed at their upper ends to the frame of the tractor T, and in the form shown are affixed to the rear axle housing.

Steering mechanism is provided for producing transverse movement of the implement 10 with respect to the tractor T and in the form shown, such means includes an extendible and retractable hydraulic motor which is indicated in general by numeral 21 and which includes a hydraulic cylinder with a piston movable longitudinally therein. The cylinder of the hydraulic motor 21 is oriented generally transversely with respect to the direction of travel and the outer end of the cylinder is connected as by a bracket 22 at the rear end to one of the swingable drawbars 13 and the outer end of the piston rod is swingably connected to the frame structure of the tractor T. It will therefore be seen that as the tractor and implement move along the field, retraction of the piston rod causes transverse movement of the implement in one direction and extension of the rod causes transverse movement of the rod in the other direction.

Means are provided on the implement for detecting the location of a crop row in relation to the position of the implement, and in the form shown, such means includes a rigid crop-row-location-detecting device, indicated in general by numeral 23. The detecting device includes a pair of elongate and juxtaposed crop row feelers 24 and 25 which extend generally longitudinally of the direction of travel and are spaced apart to pass along on opposite sides of the crop row. The front end portions of feelers 24 and 25 are rigidly affixed, as by welding, to a pair of horizontally oriented cross shafts 26 and 27. The feelers 24 and 25 have upwardly inclined forward end portions and substantially horizontal rear, ground-engaging portions. The front end portions of feelers 24 and 25 converge toward each other in a rearward direction and the rear end portions thereof are substantially parallel to each other. Mechanism is provided for mounting the rigid detecting device 23 for movement about horizontal and upright axes, and in such a position that the feelers 24 and 25 are substantially aligned with the respective wheels 12 of one set of the wheels on the implement. Such mechanism includes a rigid frame member 28 which extends horizontally between the drawbars 13 and is swingably connected thereto as by pivots 29. The rigid frame member 28 has a pair of shaft mounting sleeves 30 and 31 affixed thereto as by welding, and an upright shaft 32 extends through the sleeves 30 and 31 and has a collar 33 affixed thereto as by the set screw 33a Collar 33 is disposed between the sleeves 30 and 31 to retain the shaft 32 in the desired vertically adjusted position. The lower end of shaft 32 is affixed as by welding to a horizontally oriented sleeve 34 which encompasses shaft 26 and rotatably mounts the detecting device for swinging oscillation about a substantially horizontal axis. A pair of retaining collars 35 are affixed as by set screws on the shaft 26 and bear against the ends of sleeve 34 to prevent endwise movement of the shaft 26 as it rotates in the sleeve 34.

Means are provided for urging the feelers downwardly into engagement with the ground surface adjacent the crop row and in the form shown, such means comprise a spring 36, the lower end of which is hooked through an apertured ear 37 on a sleeve 38 which encompasses and is rotatable on the shaft 27 and is retained against endwise movement along the shaft by a pair of collars 39 which are stationary with the shaft. The upper end of spring 36 is anchored on a bracket or strap 40 which is affixed to the axle housing of the tractor.

Control mechanism is provided for operating the steering mechanism in response to swinging of the crop row location-detector 23 about the upright axis of shaft 32. Such control mechanism includes a hydraulic valve 41 of the double-acting type which has a reciprocating valve stem 42 which is internally spring-loaded to its neutral position. The valve 41 is connected to the hydraulic motor 21 and is also connected to the hydraulic pump P on the tractor T by suitable fluid conduit means so that when the valve stem 42 is longitudinally shifted in one direction the motor 21 causes transverse movement of the implement in one direction with respect to the tractor, and when the valve stem 42 is moved in the other direction, the implement 11 is moved in the other direction transversely with respect to the tractor. The valve 41 is bolted to a plate 43 which has a pair of upright supporting posts 44 welded thereto. The posts 44 are slidable in sleeves 45 which are welded to the rigid frame member 28 in a substantially U-shaped offset portion 28a thereof. Set screws 45a are provided in the sleeves 45 for fixing the vertical positions of the posts 44.

The control mechanism also includes an operating lever 46 for moving the valve stem 42 inwardly and outwardly. The operating lever 46 extends through the bifurcated end of valve stem 42 and is swingably secured therein by a pivot pin 48. The upper end of lever 46 has a rounded, ball-shaped bearing 47 formed integrally thereof and seated in a downwardly opening socket in the portion 49 of the valve housing structure.

A two-part connection is provided between the lower end of lever 46 and the detector device 23 to permit rotary oscillation of the parts relative to each other about the horizontal axis of swinging of the detector device 23. In the form shown, the two-part connection includes a substantially spherical bearing or ball 50 affixed to or formed integrally of the lower end of lever 46 and disposed with its center in substantial alignment with the axis of shaft 26 which comprises the axis of upward or downward swinging of the detector device 23. The other part of the two-part connection comprises a pair of parallel plates 51 and 52 which are affixed as by welding to the detector device 23 and more specifically to the feeler 24 in such a position that the axis of the shaft 26 extends midway therebetween. The plates 51 and 52, which extend transversely of the direction of travel are normally oriented is substantially vertical planes when the control device 23 is in its normal ground-engaging position. It will therefore be seen that when the detector device is moved about the upright axis of shaft 32, the ball 50 at the lower end of lever 46 is moved in a fore or aft direction to swing the lever 46 about the ball 47 and cause movement of the valve stem 42. It should be understood that in normal operation of the detector 23 and lever 46, the amount of actual swinging of the lever 46 is only slight and therefore, the center of the ball 50 and plates 51 and 52 provide a rotatable joint at the axis of shaft 26, the lever 46 will remain stationary in spite of vertical swinging of the detector device 23 about the axis of shaft 26 as the feelers 24 and 25 move along the ground surface. As a result, the implement steering mechanism is operated only when the course of the implement deviates in a direction transversely of the crop row and the steering mechanism is not effected whatsoever by changes in the ground contour. This aspect is important particularly in harvesting such crops as sugar beets because the surface contour of many fields is quite irregular. The feelers 24 and 25 will follow the surface contour down into ditches and up again without effecting operation of the steering mechanism.

To provide for lifting the feelers 24 and 25 out of engagement with the ground surface so as to permit running of the tractor and implement along a highway, a chain 53 may be secured at one end to the rear end of the feeler 25, and the upper end of chain 53 may be secured on a hook or other anchoring portion of the implement frame. It should be understood that when the implement and crop row-location-detector device 23 are in operation, the chain 53 will be allowed to hang slack so as to allow the feelers 24 and 25 to engage and ride along the ground surface. Ordinarily, the feelers 24 and 25 will have their lower edges riding a fraction of an inch below the actual surface of the soil. When the implement is properly oriented with respect to the crop row, neither of the feelers 24 and 25 will engage the crop row or more specifically the sugar beets, and the center spring for valve stem 42 will also tend to hold the detector device 23 in centered position.

It should be understood that some types of implement have only a single draft connection to the tractor and the tractor may have a swinging drawbar. In such types of implements, the hydraulic motor 21 may be anchored at one end to the frame of the tractor and the other end thereof (the piston rod) may be connected to the swinging drawbar so as to move the same in directions transverse to the direction of travel. The mounting sleeves 30 and 31 may be affixed as by welding to the rigid frame of the implement. The operation of such an installation is substantially identical to that herein described.

It will be seen that I have provided a new and improved apparatus for steering an implement for transverse movement relative to the tractor and to the direction of travel thereof and for detecting the location of the crop row relative to the implement regardless of the nature of the surface contour over which the tractor and implement are moved.

It will, of course, be understood that various changes may be made in the form, detail, arrangement and proportion of the parts without departing from the scope of my invention which consists of the matter described herein and set forth in the appended claims.

What is claimed is:

1. The combination with an implement having means attachable to a tractor and permitting movement of the implement relative to the tractor and transversely of the direction of travel, of a rigid crop row-locating-detecting device including a pair of substantially rigid, elongate and juxtaposed crop row-engaging feelers rigidly interconnected and extending in the direction of travel to pass along opposite sides of the crop row, means mounting said device adjacent the front ends of the feelers for movement about a single upright axis, steering mechanism connected with the implement to move the same transversely of the direction of travel, means connecting the steering mechanism with said device and operating the steering mechanism in response to movement of the device about the upright axis.

2. The combination with an implement having means attachable to a tractor and permitting movement of the implement relative to the tractor and transversely of the direction of travel thereof, of a rigid crop row-location-detecting device including a pair of substantially rigid, elongate and juxtaposed crop row-engaging feelers rigidly interconnected and extending generally horizontally and in the direction of travel to pass along opposite sides of the crop row, said feelers having ground-engaging rear ends and having forward ends elevated along the ground surface, mechanism mounting the detecting device on the implement and including means adjacent the front ends of the feelers permitting movement of the device about a horizontal axis extending transversely of the direction of travel and also including means adjacent the front ends of the feelers for permitting free swinging of the device about an upright axis, means urging the rear ends of the feelers downwardly into the ground, steering mechanism connected with the implement to cause movement there transversely of the direction of travel, and means connecting the steering mechanism with said device and operating the steering mechanism in response to movement of the device about the upright axis.

3. The combination with an implement having means attachable to a tractor and permitting movement of the implement relative to the tractor and transversely of the direction of travel, of a rigid crop row-location-detecting device including a pair of elongate and juxtaposed crop row-engaging feelers extending in the direction of travel to pass along opposite sides of the crop row, mechanism mounting the detecting device on the implement and including means adjacent the front ends of the feelers and permitting movement of the detecting device about a horizontal axis and also including means adjacent the front ends of the feelers for permitting movement of the detecting device about an upright axis, means urging the rear ends of the feelers downwardly into inclined, ground-engaging position, steering mechanism connected with the implement to produce movement thereof transversely of the direction of travel, control mechanism operating the steering mechanism in response to movement of the detecting device about the upright axis and including an operating lever with one end thereof spaced from said upright axis, means swingably mounting the lever on the implement to permit movement of said end transversely of said upright axis, and means connecting the end of the lever and the detecting device for movement transversely of the upright axis and including a swingable joint with a swing axis coaxial of the horizontal axis of the detecting device, whereby the feelers may follow the ground contour without operating said lever, and will engage the sides of the crop row to produce swinging of the detecting device about the upright axis and cause movement of said lever for operating the steering means.

4. The combination with an implement having means attachable to a tractor and permitting of the implement relative to the tractor and transversely of the direction of travel, of a rigid crop row-location-detecting device including a pair of elongate and juxtaposed crop row-engaging feelers extending in the direction of travel to pass along opposite sides of the crop row, mechanism mounting the detecting device on the implement and including means adjacent the front ends of the feelers and permitting swinging of the device about a horizontal axis and also including means adjacent the front ends of the feelers permitting movement of the device about an upright axis, steering mechanism connected with the implement to move the same transversely of the direction of travel, means operating the steering device in response to movement of the device about the upright axis and including an operating lever with one end spaced in a direction transversely of the direction of travel from said upright axis of the detecting device, means mounting the lever on the implement to permit fore-and-aft swinging of said end, a two-part connection between said end of the lever and the detecting device, one part being relatively rotatable with respect to the other part about an axis in alignment with the horizontal axis of the detecting device, one part being secured to the end of the lever and the other part being secured on the detecting device, and one part comprising a substantially spherical ball with the center thereof in alignment with the horizontal swing axis of the detecting device, and the other part comprising a pair of rigidly interconnected and upright plates extending transversely of the direction of travel and spaced from each other in a fore-and-aft direction on opposite sides of the ball and in engagement therewith, whereby the end of the lever is moved in a fore-and-aft direction only by movement of the detecting device about the upright axis.

5. The combination with an implement having means attachable to a tractor and permitting movement of the implement relative to the tractor and transversely of the direction of travel, of a rigid crop row-location-detecting device, including a pair of elongate and juxtaposed crop row-engaging feelers extending in the direction of travel to pass along opposite sides of the crop row, mechanism mounting the detecting device on the implement and including means adjacent the front ends of the feelers permitting movement of the device about a horizontal axis and also including means adjacent the front ends of the feelers for permitting movement of the device about an upright axis, means urging the rear ends of the feelers downwardly into inclined, ground-engaging position, steering mechanism connected with the implement to move the same transversely of the direction of travel, means operating the steering mechanism in response to movement of the detecting device about the upright axis and including an operating lever having one end spaced in a direction transversely of the direction of travel from the upright axis of the detecting device, means mounting the lever on the implement to permit fore-and-aft swinging of the ends thereof, a substantially spherical bearing secured on the end of said lever and disposed with its center in substantial alignment with the horizontal swing axis of the detecting device, and a pair of upright rigid plates on the detecting device and extending transversely of the direction of travel on opposite sides of said bearing and in engagement therewith and operating said lever only in response to movement of the detecting device about the upright axis thereof.

6. The invention set forth in claim 3 wherein the steering mechanism comprises a reversible hydraulic motor, and said means operating the steering mechanism in response to movement of the detecting device includes a reversing hydraulic valve operated by said lever for controlling the hydraulic motor.

7. The invention set forth in claim 5 wherein the mechanism mounting the detecting device includes means permitting vertical adjustment of the detecting device and the means mounting the lever is also vertically adjustable to maintain the center of the spherical bearing in alignment with the horizontal swing axis of the detecting device.

8. The invention set forth in claim 2 wherein said feelers have rear ends spaced from each other a distance less than the spacing between the front ends of the feelers.

9. Apparatus to cause an implement to follow along a row of sugar beets which are ready for harvesting, comprising a mounting frame, a pair of elongate and substantially rigid ground and beet-engaging blades rigidly interconnected in juxtaposed and spaced relation with each other to be disposed on opposite sides of the beet row and to travel forwardly therealong, said blades having forwardly and upwardly inclined forward edge portions and having rear portions with bottom edges to slide along the ground, means swingable mounting the forward ends of said blades on said frame for movement about a substantially vertical axis and also about a horizontal axis extending transversely of said blades and of the direction of travel, spring means biasing said blades to swing said rear portions downwardly into the ground, power driven steering apparatus for steering the implement, said apparatus having a control regulating application of power thereto, said control being connected with said beet-engaging blades to be operated when said blades move about said vertical axis.

References Cited in the file of this patent
UNITED STATES PATENTS

| | | |
|---|---|---|
| 2,608,146 | Lund | Aug. 26, 1952 |
| 2,610,562 | Ward | Sept. 16, 1952 |
| 2,749,824 | Friday | June 12, 1956 |

UNITED STATES PATENT OFFICE
CERTIFICATE OF CORRECTION

Patent No. 2,993,548                      July 25, 1961

Lyle Oliver Kiel

It is hereby certified that error appears in the above numbered patent requiring correction and that the said Letters Patent should read as corrected below.

Column 5, line 8, for "there" read -- thereof --; column 6, line 59, for "swingable" read -- swingably --.

Signed and sealed this 5th day of December 1961.

(SEAL)
Attest:

ERNEST W. SWIDER                      DAVID L. LADD
Attesting Officer                      Commissioner of Patents

USCOMM-DC